UNITED STATES PATENT OFFICE.

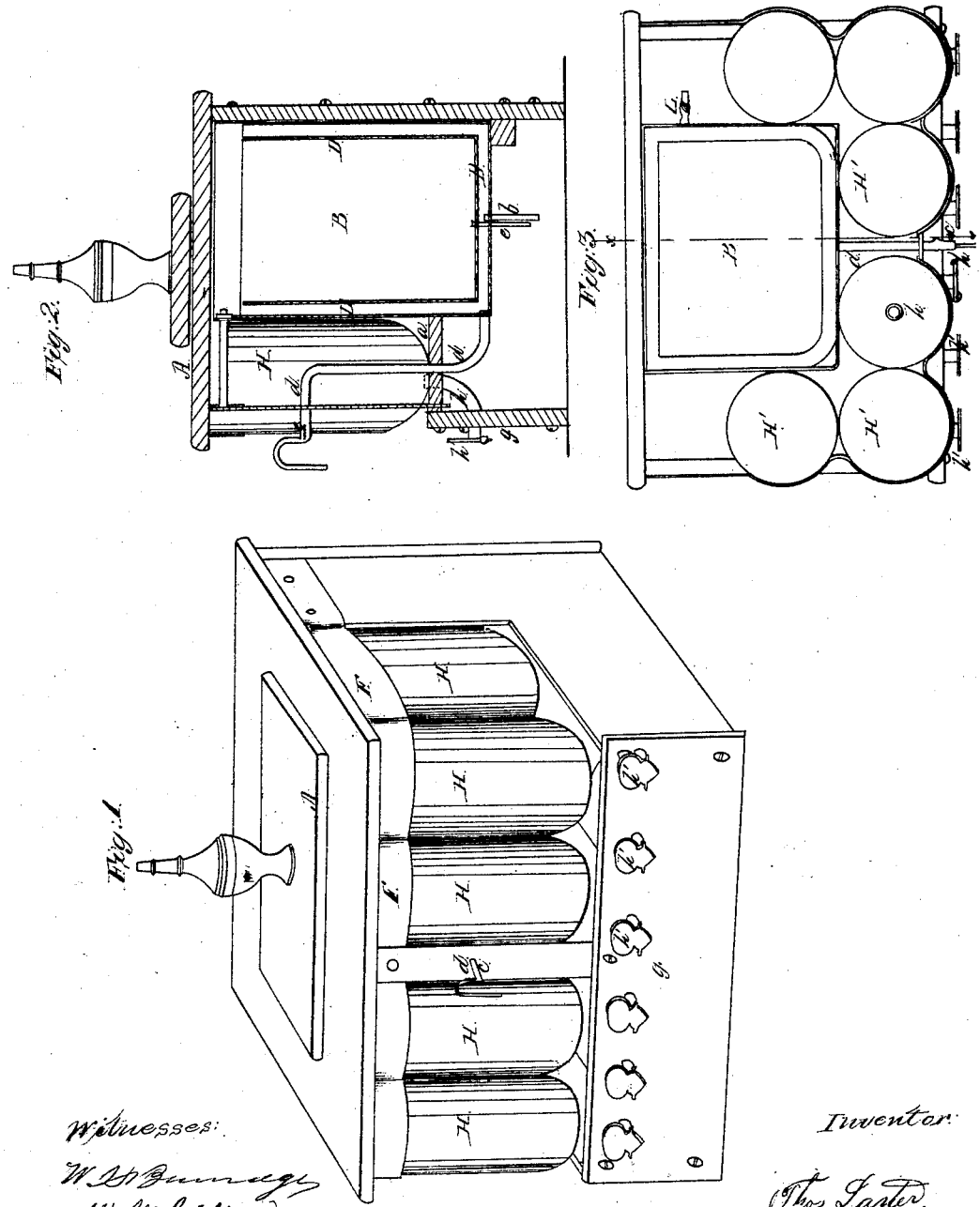

THOMAS LARTER, OF CLEVELAND, OHIO.

IMPROVED COMBINED CASTER AND COOLER FOR SODA-FOUNTAINS.

Specification forming part of Letters Patent No. 45,504, dated December 20, 18 4.

*To all whom it may concern:*

Be it known that I, THOMAS LARTER, of Cleveland, in the county of Cuyahoga and State of Ohio, have invented certain new and useful Improvements in a Combined Caster and Cooler for Soda-Fountains; and I do hereby declare that the following is a full and complete description of the construction and operation of the same, reference being had to the accompanying drawings, making a part of this specification, in which—

Figure 1 is a perspective view of the combined caster and cooler. Fig. 2 is a vertical section in the direction of the line $x$ $x$ in Fig. 3. Fig. 3 is a top view with the cover removed.

Similar letters of reference denote like parts in the different views.

My improvement relates to a combined caster and cooler for soda-fountains, in which the soda-water is cooled in a chamber around an ice-chamber and the caster is arranged around the cooler, consisting of glass cruets, secured in place, from which the sirup is d awn through curved tubes extending from the lower ends of the cruets to gates or faucets on the outside, by which the discharge of the sirup is regulated.

Fig. 1 represents the caster and cooler, which can be of any appropriate form, with an adjustable cover, A, on the top. The cooler consists of an ice-chamber, B, with a chamber, D, around the sides and under the ice-chamber, as shown in Fig. 2. $b$ is a pipe or tube, that connects the chamber D with the soda-fountain, from which the chamber is continually supplied with soda-water. $d$ is a bent tube, entering the lower part of the chamber D at the front side and extends up through the partition $a$ and out in front of the caster, as represented, from which the soda-water is drawn, being operated by the faucet $c$. $e$ is a pipe, connected with the ice-chamber, through which the surplus water is conveyed from the chamber.

The glass cruets H, forming the caster, are arranged around the cooler in front and at the ends, as represented, being secured at the lower ends in the partition $a$, and F is a guard around the top, keeping them in place. There is a curved tube, $h$, connected with each cruet at the lower end, as shown in Fig. 2, that extends out through the piece $g$ to the front, and to the end is connected a gate or faucet, $h'$, by means of which the sirup is drawn from the cruet by moving the gate to one side. There are covers on the top of the cruets (seen at H', in Fig. 3,) that are removed when the cruets are being filled with the sirups.

There are many advantages in a cooler and caster arranged in this manner. In the first place, from the mode of cooling the soda-water in the chamber D.

Where the soda-water is cooled in coiled pipes in an ice-chamber in the ordinary manner, gas collects here and there in the pipes, and as the soda-water is being drawn the gas, in escaping, causes the water and gas to rush out alternately. The action of the gas rushing out forces the sirup and soda-water from the tumbler held to receive it, spattering the sirup and soda-water all about and over the persons near the fountain, which is very disagreeable and untidy, attracting flies and insects around the fount; but with my arrangement in the chamber D the gas rises to the top, and when there is an excess of gas it can be let off by the faucet L, and as the soda-water is drawn from the lower part of the chamber it is never interrupted by the escape of gas, but flows smoothly and uniformly from the place of discharge.

The pressure of the gas above in the chamber is in proportion to the pressure below, so that it does not affect the discharge of the soda-water through the pipe $d$.

The caster as arranged is most convenient and desirable in every way. Glass cruets being used, removes all liability of the sirup being injured, as in the use of metallic vessels, in which the sirups, being more or less acid, oxidates the metal, which injures the taste and color of the sirups. The different-colored sirups also, shining through the glass, give the fount a more ornamental appearance.

By means of the caster as arranged the sirups can be drawn without handling the bottles, as in the ordinary way of making soda-water—being so much neater, cleaner, and more convenient.

Coiled pipes may be used in place of the chambers D in connection with the caster, but I prefer the chamber D, as described.

What I claim as my improvement, and desire to secure by Letters Patent, is—

1. The separate glass cruets H, provided with the tube $h$ and faucet $h'$, when arranged and operating in the manner and for the purpose set forth.

2. The ice-chamber B, in combination with the chamber D and cruets H, when the whole are arranged as herein set forth.

THOS. LARTER.

Witnesses:
W. H. BURRIDGE,
A. W. McCLELLAND.